Feb. 20, 1940. A. L. MARTIN 2,190,722
MACHINE FOR SHAPING WIRES WHICH ARE INTENDED
FOR BINDING PERFORATED LEAFLETS
Filed May 19, 1938 6 Sheets-Sheet 1

Inventor:
André Lucien Martin
By Haseltine, Lake & Co.
Attorneys

Feb. 20, 1940.  A. L. MARTIN  2,190,722
MACHINE FOR SHAPING WIRES WHICH ARE INTENDED
FOR BINDING PERFORATED LEAFLETS
Filed May 19, 1938  6 Sheets-Sheet 2
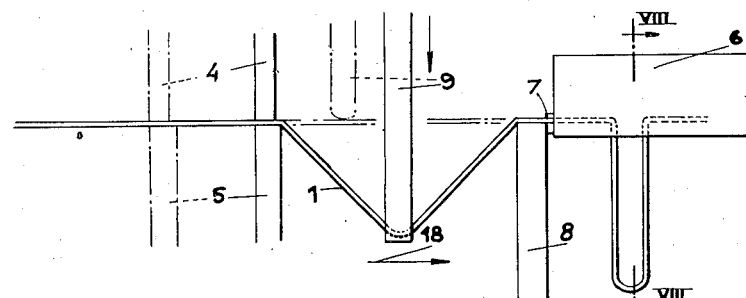
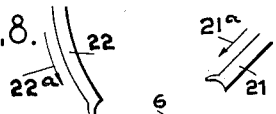
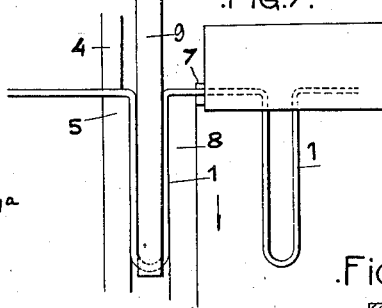
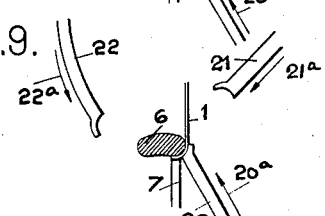
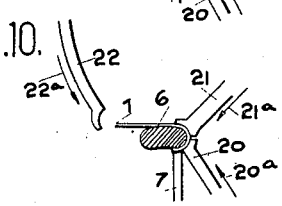
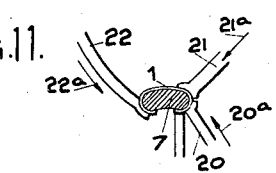
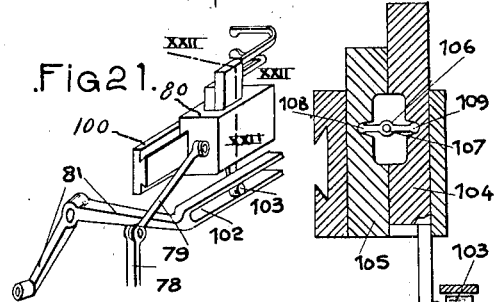
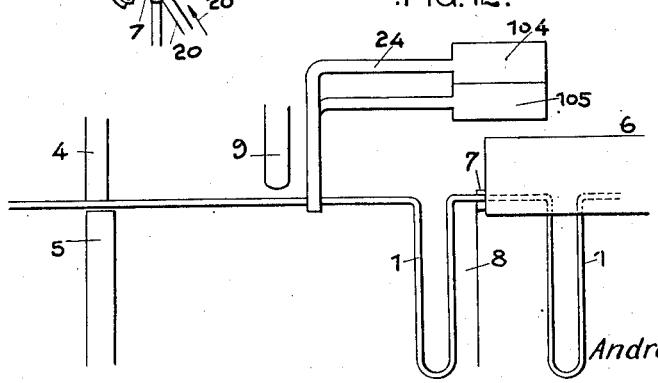
Inventor
André Lucien Martin
By Haseltine, Lake & Co
Attorneys

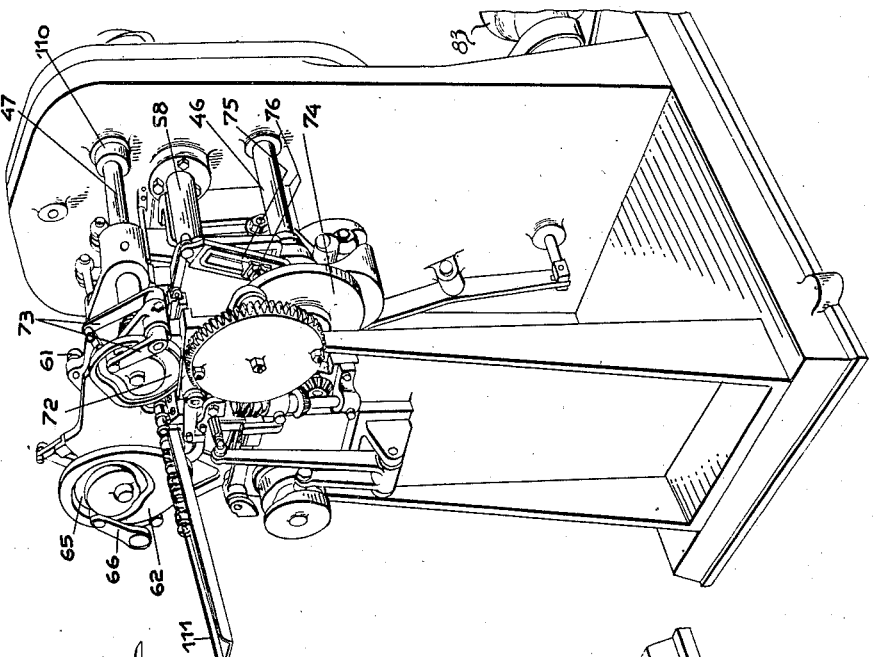
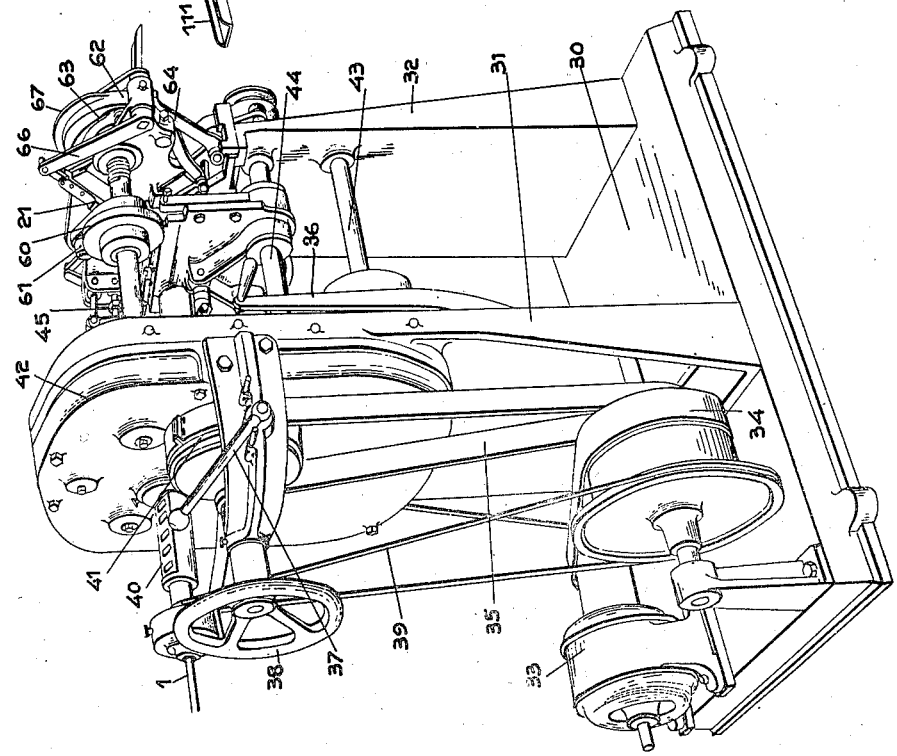

Feb. 20, 1940.  A. L. MARTIN  2,190,722
MACHINE FOR SHAPING WIRES WHICH ARE INTENDED
FOR BINDING PERFORATED LEAFLETS
Filed May 19, 1938   6 Sheets-Sheet 4

Inventor
André Lucien Martin
By Haseltine, Lake & Co.
Attorneys

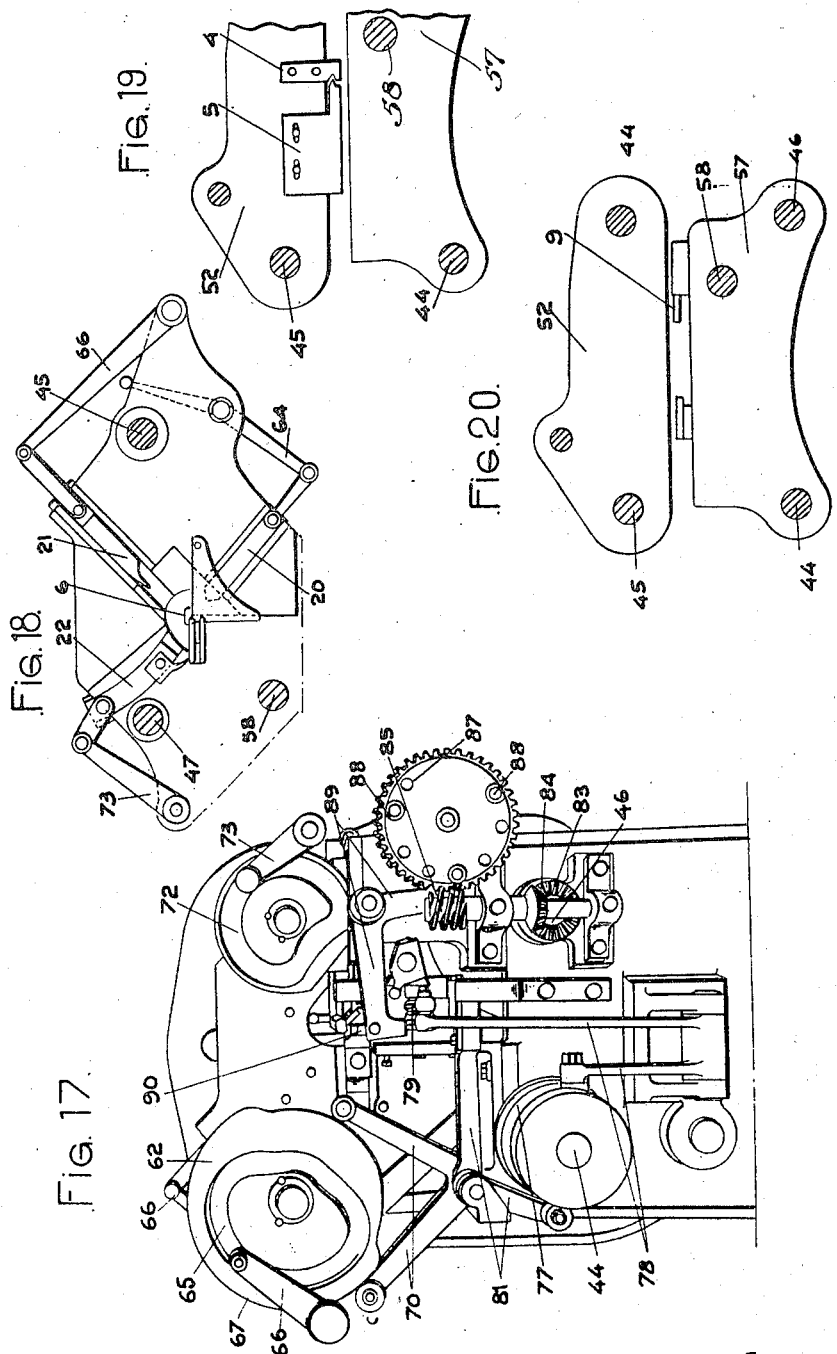

Inventor
André Lucien Martin
By Haseltine, Lake & Co.
Attorneys

Patented Feb. 20, 1940

2,190,722

UNITED STATES PATENT OFFICE 2,190,722

MACHINE FOR SHAPING WIRES WHICH ARE INTENDED FOR BINDING PERFORATED LEAFLETS

André Lucien Martin, Paris, France

Application May 19, 1938, Serial No. 208,843
In France May 24, 1937

8 Claims. (Cl. 140—71)

The present invention has for its object a machine for shaping wires which are intended to bind perforated leaflets that are shaped, in the same plane, in such a manner as to form a festoon of loops, said loops then being rolled about a longitudinal axis parallel to said plane.

The machine according to the invention is mainly characterized, in a first automatically operating embodiment, by the fact that the loops are made successively, either one by one, or by groups of two or three and are rolled as they are formed.

Said machine, into which a straight wire is fed and which enables wires to be obtained at the output end which form a festoon of loops and are rolled and cut to the desired length, is characterised in particular by the combination, in the same unit, of two systems which are adapted to pinch the wire at two predetermined points, of a shaper push rod initially placed at equal distances between the two systems, one of the systems being in principle fixed while the other moves parallel with the wire an amount that is double that of the translation, in the same direction, of the push rod which moves at the same time perpendicular to its translation, in such a manner that at the end of its travel the push rod is pinched, with the interposition of the wire, between the two systems for forming a loop, of a cambering mandrel placed after the second system of which it may form one of the elements and on which each loop is rolled through the instrumentality of cambering tools suitably distributed about the mandrel and which act successively, a reciprocating nipper feeding the wire step by step, which wire, after it has been shaped into rolled loops, is cut to the desired length by a knife arranged at the output end of the machine.

The first system for pinching the wire comprises a jaw, rigidly fixed on a first carriage which is movable in translation, and on said carriage, a movable jaw which is displaceable in synchronism with the other members of the machine.

The shaper push rod is movable in translation on a second carriage which is likewise movable in translation.

The second system for pinching the wire comprises a fixed part which is formed by a cambering mandrel and a movable jaw pinching the wire under the mandrel, and which is secured to a part which, with the shaper push rod and the movable jaw of the first pinching system, forms the device for shaping each loop.

The nipper comprises two jaws which are movable on a slide, the jaws and the slide being actuated by two different members.

The members of the machine act in synchronism.

The machine may furthermore be provided with a wire straightener of any appropriate type (staggered V's having rotary movements or staggered rollers along the path of the wire).

In a modified embodiment which may be adapted to be manually operated, a rotating part forming four cams is used which act successively on a lever for locking the wire on a carriage which is driven in translation by said lever and under the action of the cams, for the successive feeding of the wire:

(a) The depth of a loop,
(b) The width of a loop,
(c) The depth of a loop,
(d) The distance between two loops.

The wire, which passes in a groove provided in a part forming a shaper, is bent over on said part, at each movement and in the suitable direction, by a projection secured to an operating lever, a device for lifting the wire being provided to enable the projection to pass from one side of the wire to the other.

Wires formed into a series of loops are thus obtained flat.

The cambering is then effected by the action of a mandrel pressed between two swinging cambering jaws.

The invention further covers other particular points which will become apparent in the ensuing description taken with reference to the accompanying drawings which is only given by way of example and in which:

Fig. 6 is a plan view corresponding to the previous figure, but showing the various members in the positions they occupy at the beginning of the formation of a loop.

Fig. 7 is a corresponding view but showing the various members in the positions they occupy at the completion of the formation of the loop.

Fig. 8 is a section taken along the line VIII—VIII of Fig. 6 and showing the position of the three cambering tools before they become operative.

Fig. 9 is a view corresponding to the previous figure after the forward movement of the first cambering tool.

Fig. 10 is a corresponding view after the forward movement of the second tool.

Fig. 11 is a corresponding view after the forward movement of the third tool.

Fig. 12 is a plan view corresponding in principle to Fig. 5 and showing the position of the various members and of the nipper for moving one step.

Fig. 13 is an overall three-quarter perspective view seen from the front of the machine.

Fig. 14 is an overall three-quarter perspective view seen from the rear of the machine.

Fig. 17 is a partial perspective view seen from the end of the machine.

Fig. 18 is a diagrammatical view with a section taken along the line XVIII—XVIII of Fig. 16 and looking in the direction of the arrows.

Fig. 19 is a diagrammatical view with a section taken along the line XVIII—XVIII of Fig. 16 and looking in the opposite direction to that of the arrows, the shaper push rod being removed.

Fig. 20 is a diagrammatical view corresponding to the previous figure and showing the shaper push rod, the first pinching system being removed.

Fig. 21 is a diagrammatical perspective view showing the mounting of the nippers for the step by step movement.

Fig. 22 is a section taken along the plane XXII—XXII—XXII of the previous figure.

Figure 1:
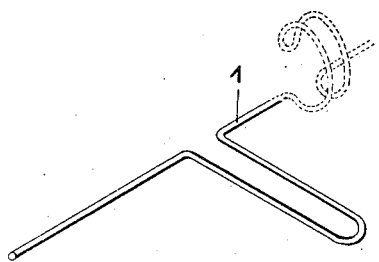
Fig. 1 is a perspective view of a wire in which a loop has been made.
Figure 2:
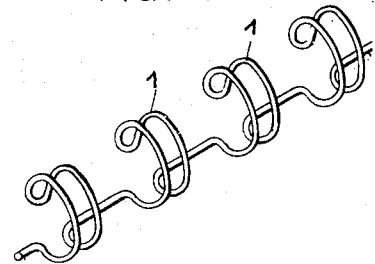
Fig. 2 is a perspective view of a wire formed into a festoon of loops and rolled.
Figure 3:
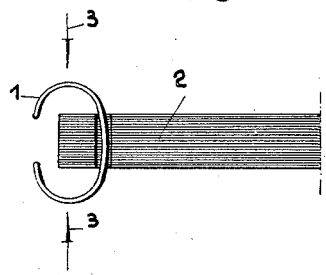
Fig. 3 shows the mounting of the perforated leaflets in the wire illustrated in the previous figure.
Figure 4:
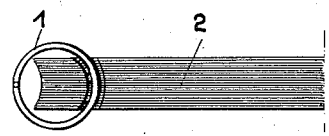
Fig. 4 is a corresponding view after complete closing.

The machine according to the invention enables a wire 1, which has been formed into a festoon of loops and rolled as shown in Fig. 2, to be obtained from a straight wire. Before the loops are cambered, the same are successively formed flat as shown in Fig. 1. The wire, which is shaped as shown in Fig. 2, is engaged in perforated leaflets 2 (Fig. 3) and then closed (Fig. 4) by an action in the direction of the arrows 3 (Fig. 3).

Figure 5:
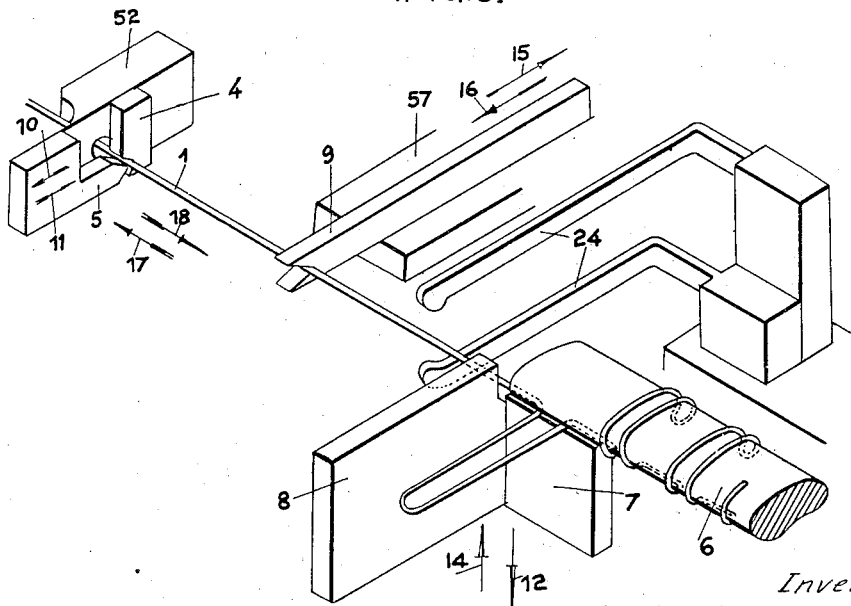
Fig. 5 is a diagrammatical perspective view showing the relative arrangement of the main members for shaping the wire into loops.

Fig. 5 shows, in perspective and diagrammatically, the various members of the machine which effect the formation of the loops. The device for forming the loops comprises:

A first system for pinching the wire 1 comprising a jaw 4 rigidly fixed on an upper carriage 52 and a jaw 5 which is movable in translation on said carriage;

A second system for pinching the wire 1 comprising a mandrel 6, which is also used for the cambering as will be described hereinafter and a movable jaw 7 secured to a shaping part 8.

And a shaper push rod 9 which is movable in translation on a second movable carriage 57.

The jaw 5 can move in translation on its carriage 52 in two opposite directions indicated by the arrows 10 and 11.

The movable jaw 7, which is secured to the part 8, can move in translation in two opposite directions indicated by the arrows 12 and 14. The shaper push rod 9 can move, in the direction of the arrows 15, 16 and 17, 18. Similarly, the assembly formed by the jaws 4 and 5 can likewise move in the direction of the arrows 17 and 18 as indicated hereinafter.

The various members being in the position illustrated in Fig. 5, in which the push rod 9 is located at equal distances between the jaw 5 and part 8, the formation of a loop is effected in the following manner. The wire 1 being pinched, on the one hand between the jaws 4, 5 and on the other hand between the mandrel 6 and the jaw 7, the assembly formed by the jaws 4, 5 moves in the direction of the arrow 18 at the same time as the push rod 9 moves both in the direction of the arrows 16 and 18 (Fig. 6). The amount of the translatory displacement of the group of jaws 4, 5 in the direction of the arrow 18 is double that of the push rod 9 in the direction of the arrow 18.

The various members finally come into the position illustrated in Fig. 7 in which a loop is formed.

The mechanism which has just been described for forming a loop can be multiplied. It is for example possible to juxtapose two mechanisms for producing two loops simultaneously. In this case, the relative translations of the jaws and of the push rods are suitably determined.

During the forming of said loop, the previously formed one is rolled on the mandrel 6. The rolling or cambering of the loops is more particularly shown in Figs. 8 to 11. About the mandrel 6 are arranged three cambering tools 20, 21 and 22, the two first moving in straight slide-ways, the third in a curved slide-way.

The previously formed loop which has been brought against the mandrel 6 by a part 24 (see Fig. 5) as will be indicated hereinafter, is held at its base against the mandrel 6 by the jaw 7.

The tools 20, 21 and 22 are then successively and respectively moved in the direction of the arrows 20ª, 21ª, 22ª, as shown in Figs. 9, 10 and 11 so as to produce the rolling or the cambering to the desired shape illustrated in Fig. 2, in three successive operations.

After cambering, the tools are brought back to their initial positions and the nipper 24 is moved in the direction of the arrow 17 and pinches the wire and moves same one step in the direction of the arrow 18. The various members having returned to their initial positions (Fig. 12), the jaws 5 and 7 are respectively moved in the direction of the arrows 10 and 14 to release the wire and enable it to be fed one step forward.

Reference will now be had to Figs. 13 to 17 which show the whole machine and the various synchronized actuating mechanisms.

The machine is provided with a base 30 provided with two uprights 31 and 32.

On the base 30 is mounted a motor 33 which actuates, by means of belts 34 and 35, one of the elements of a friction clutch. The engagement of the clutch is effected by acting on the levers 36 and 37, a wheel 38 enabling the machine to be driven by hand.

It will be observed that the motor 33 also actuates, through the intermediary of a counter-pulley and a belt 39, a cage 40 or any other appropriate mechanism for straightening the wire 1 which is unwound as required from a reel not shown.

The friction clutch 41, through the intermediary of gears arranged in a case 42, rotates the shafts 43, 44, 45, 46 and 47.

Figure 16:
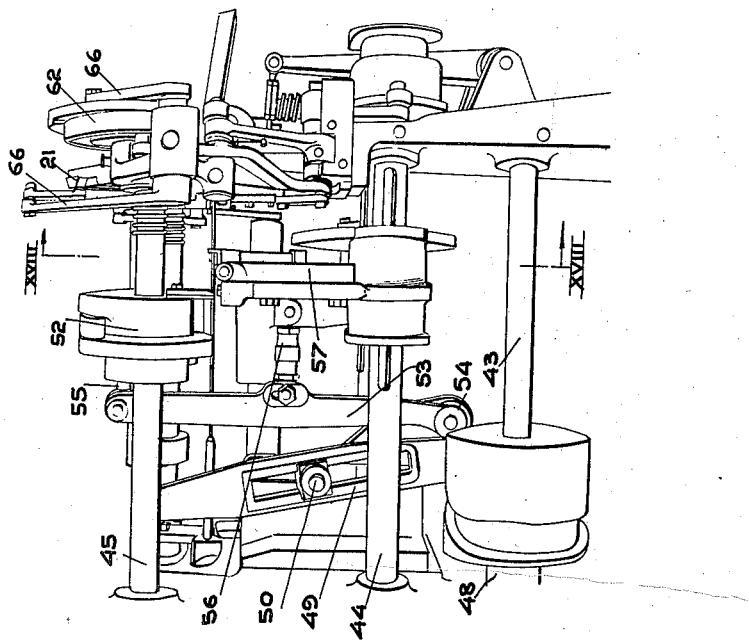
Fig. 16 is a partial perspective view seen from the front of the machine.
Figure 15:
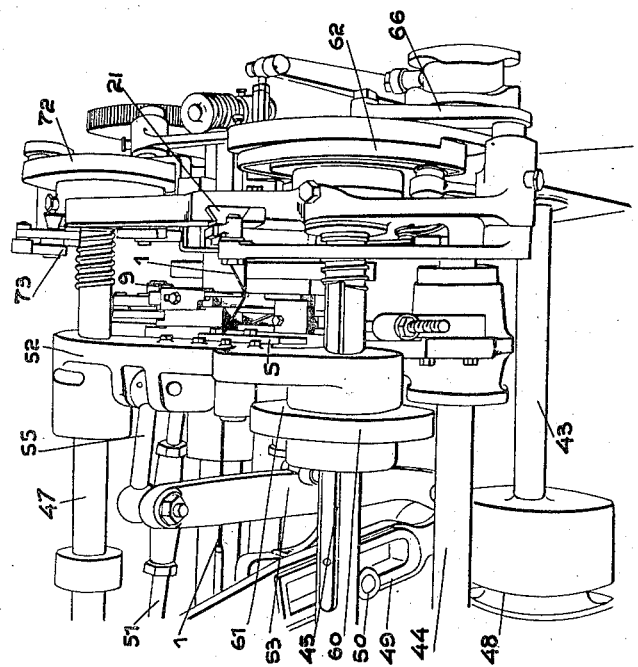
Fig. 15 is a partial three-quarter top and front perspective view of the machine.

The shaft 43 carries a grooved cam 48 in which engages a roller secured to an arm 49 which is pivoted about a pin 50 the position of which is adjustable (Fig. 16). On said arm 49 is pivoted a connecting rod 51 of adjustable length which controls the translation of the upper carriage 52 carrying the jaws 4 and 5 (Fig. 15).

A lever 53, which is pivoted about a fixed pin 54, is connected at its upper end, by a connecting rod 55, to the upper carriage 52 of which it receives the movement. Said lever 53 is furthermore connected by an adjustable connecting rod 56 to the lower carriage 57 carrying the shaper push rod 9.

The upper carriage 52 is guided in translation on the shafts 45 and 47. The guiding of the lower carriage 57 being ensured by the shafts 44 and 46 and also by a fixed bar 58.

On the shaft 45 is mounted a grooved cam 60 which controls, through the intermediary of a system of jointed levers 61, the movements of the jaw 5.

On the shaft 45 is also mounted a part 62 forming a triple cam. For this purpose, the part 62 is provided on one face with a groove 63 for actuating the cambering tool 20 through the intermediary of levers 64, and on the other face with a groove 65 for actuating the cambering tool 21 through the intermediary of levers 66. Furthermore, the periphery of the part 62 forms a cam 67 which is constructed for producing, through the instrumentality of the forked lever 70, the desmodromic control of the jaw 7 for pinching the wire against the mandrel 6. This control is a mechanical control owing to the fact that the displacement in both directions is effected by the very shape of cam 67 and owing to the fork lever 70 which dispenses with a return by a spring.

On the shaft 47 is fixed a grooved cam 72 which actuates the cambering tool 22 through the intermediary of levers 73.

On the shaft 46 is fixed, against rotation only, a grooved cam 74 which actuates the shaper push rod 9 through the intermediary of a lever 75, the fulcrum 76 of which is adjustable.

On the shaft 44 is fixed a grooved cam 77 which, through the intermediary of the lever 78 and of a connecting rod 79, actuates the carriage 80 carrying the nipper 24.

The cam 77 also controls the movements of a bell crank lever 81 controlling the opening and closing of the nipper 24.

The shaft 46 actuates, through the intermediary of bevel pinions 83 and 84, a worm 85 meshing with a worm wheel 86 in which are provided holes 87. In certain of said holes are fixed abutments 88 which act on a bell crank lever 89 carrying a knife 90 for cutting the wire.

Figs. 21 and 22 more particularly show the control of the nippers 24.

As previously indicated, the carriage 80 is moved in translation along its slide-way 100 by the connecting rod 79, the opening and closing of the nippers being controlled by the bell crank lever 81.

Said bell crank lever terminates in the shape of a fork 102 in which cam moves a roller 103 mounted on one of the roots 104 of the jaws of the nippers 24. The root 104 is movable in translation in the carriage 80 and is connected to the other root 105 of the other jaw through the instrumentality of a movement reversing device. In this embodiment, the reversing device is formed by a part 106 pivoted about a pin 107 which is secured to the carriage 80 and the opposite ends 108 and 109 of which engage in corresponding recesses of the roots. By means of this arrangement, any upward movement of the root 104 causes a downward movement of the root 105 and conversely, thereby enabling the nippers to be closed or opened independently of the position of the carriage 80 on its slide-way 100.

After the straightening system, a device for stopping the wire is provided which simple acts by locking when the jaws 5 and 7 are rendered inoperative; said stopping device is controlled by a cam 110 fixed on the shaft 47.

The various movements are synchronized and the wire which is formed into festoons of loops and rolled issues ready cut in an outlet gutter 111.

Figure 23:
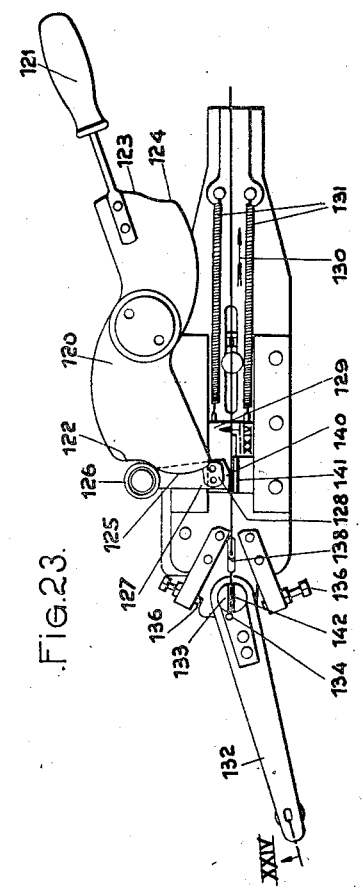
Fig. 23 is a plan view of a hand operated machine.
Figure 24:
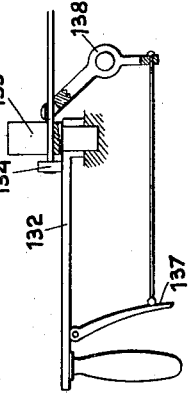
Fig. 24 is a section taken along the line XXIV—XXIV of Fig. 23.

Figs. 23 and 24 illustrate a hand machine which is provided with a rotating part 120 moved by a handle 121 and which has four parts 122 123, 124 and 125 forming cams.

Said parts forming cams successively act on a roller 126 which is journalled at the end of a lever 127 pivoted about a pin 128 secured to a carriage 129. The latter is retracted, in the direction of the arrow 130, by springs 131.

An arm 132 which is pivoted about a fixed pin 133 forming a guide and a shaper, is provided with a projection 134; the angular movement of the lever 132 is limited in both directions by adjustable abutments 136. Furthermore, a handle 137 which is connected to a lever 138 for guiding the wire, enables the latter to be lifted to pass the projection 134 on one side or the other of said wire.

The rotary movement of the part 120, by the successive actions of the four cams 122, 123, 124 and 125, enables the wire to be fed first the depth of a loop, then the width of a loop, again the depth of a loop and finally the distance between two loops.

In fact, at each action of a cam on the roller 126, the end 140 of the lever 127 locks the wire against the lateral edge 141 of the carriage while causing the desired feed of said carriage and consequently of the wire which passes through the lever 138 and engages in a groove 142 of the part 133. At each forward feed, the lever 132 is moved, either to the left, or to the right according to the cases for bending back the wire 1, by means of its projection 134, against the periphery of the part 133.

Figure 25:
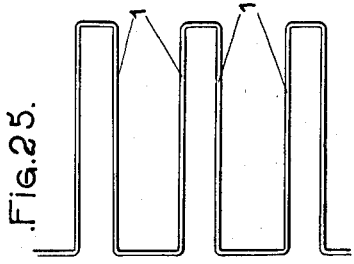
Fig. 25 shows a plan view of the wire formed into a festoon of loops and in the flat state with the hand operated machine.

With this machine, a wire formed into festoons of loops is obtained flat as indicated in Fig. 25.

Figure 26:
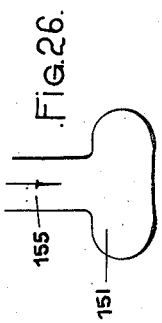
Fig. 26 is a diagrammatical section of a cambering machine for the wire which has been shaped according to Fig. 25.

Said wire thus shaped is placed, at 140, in a press (Fig. 26) comprising a shaping mandrel 151 and two jaws 152 which are pivoted at 153, retracting springs being provided at 154.

Figure 27:
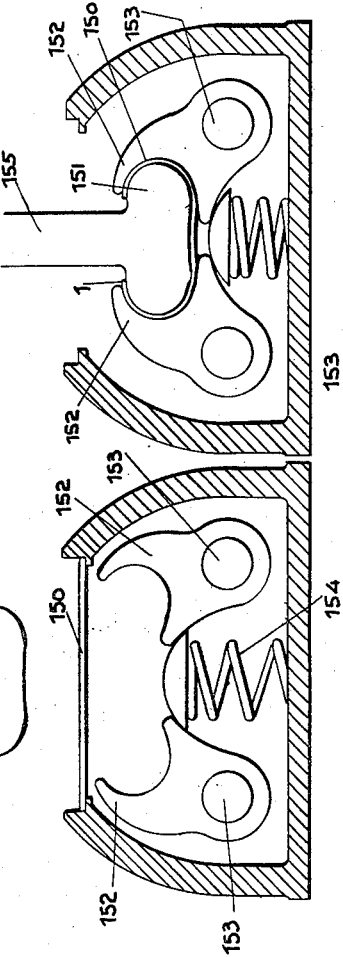
Fig. 27 is a view corresponding to the previous figure, the various members being in the position for cambering the wire.

The mandrel 151 is then lowered in the direction of the arrow 155, the various members coming into the position illustrated in Fig. 27, the wire formed into festoons of loops being rolled and cambered as desired.

It is obvious that the embodiments which have been described and illustrated are only given herein by way of indication and are not limitative. Any modifications or variations which do not in any way change the main features hereinbefore explained, or the object aimed at, remain included in the scope of the present invention.

What I claim as my invention and desire to secure by Letters Patent is:

1. In a machine for shaping wires into loops, a fixed pinching element for gripping the wire, a movable pinching element adapted to grip the wire and to move parallel to said wire, a movable shaper arranged between said pinching elements and adapted to press against the wire and to move transversely to said wire, and means for simultaneously moving said movable pinching element and said shaper for bending the wire on the shaper and according to a loop.

2. In a machine for shaping wires into loops, a fixed pinching element for gripping the wire, a first movable pinching element adapted to grip the wire and to move parallel to said wire, a movable shaper arranged between said pinching elements and adapted to press against the wire and to move transversely to said wire, means for simultaneously moving said first movable pinching element towards the fixed pinching element and said shaper transversely to the wire but also towards said fixed pinching element for bending the wire on the shaper and according to a loop, a second movable pinching element for gripping the wire and adapted to move parallel to said wire when the fixed pinching element, the first movable pinching element and the shaper are put out of action, a cambering mandrel, means for moving said second movable pinching element for bringing the wire in loops on to said mandrel, and cambering tools distributed about said mandrel and adapted to move successively for rolling the loops of the wire on said mandrel.

3. In a machine for shaping wires into loops, a fixed cambering mandrel and a movable member for constituting with said mandrel a fixed pinching element for gripping the wire, a first movable carriage so devised as to constitute a first movable pinching element adapted to grip the wire and to move in reciprocating translation parallel to said wire, a second carriage movable in reciprocating translation parallel to the wire, a shaper movable in reciprocating translation in said second carriage transversely to the wire, means for simultaneously moving said carriages and said shaper for bending the wire on the shaper and according to a loop, a second movable pinching element adapted to grip the wire and to move parallel to said wire, when the fixed pinching element, the first movable pinching element and the shaper are put out of action and for bringing the wire in loops on said mandrel and cambering tools distributed about said mandrel and adapted to move successively for rolling the loops of the wire on said mandrel.

4. In a machine as claimed in claim 3, in combination, means for straightening the wire when it enters the machine, and means for cutting the wire after it has been shaped into rolled loops at the outlet of the machine.

5. In a machine as claimed in claim 3, in combination, means for straightening the wire when it enters the machine, a cutter for cutting the wire after it has been shaped into rolled loops, means for determining the lengths of the wire to be cut by said cutter and an electric motor for synchronously controlling the carriages, the shaper, the second movable pinching element, the cambering tools and the said cutter.

6. In a machine as claimed in claim 3, in combination, a general frame so devised as to constitute a base and two uprights, bearings supported by said uprights, shafts and parallel rods carried by said bearings and adapted to slidably support said carriages, an electric driving motor, clutch devices interposed between the motor and said shafts, cams mounted on said shafts for controlling the various members of the machine.

7. In a machine operated by hand for shaping wires into loops, a rotating member moved by hand and so shaped as to have four cams, a carriage movable in translation, a lever pivoted on said carriage and between one of the ends of which and said carriage passes the straightened wire, a roller at the other end of said lever receiving the action of said cams and determining a slight rocking movement of said lever for initially locking the wire on the carriage and then the displacement of said carriage with the wire according to a length which is equal, under the action of the first cam, to the depth of a loop, under the action of the second cam, to the width of a loop, under the action of the third cam, to the depth of a loop, under the action of the fourth cam, to the distance separating two loops, a member forming a shaper provided with a groove for receiving the wire at each forward movement of the latter, a pivoted operating lever provided with a claw folding the wire over the shaper by the displacement of the operating lever and a device for lifting the wire for allowing the passage of the claw from one side to the other of the wire so that, by the successive and alternate actions of the cams and of the lever with its claw, the wire is shaped into loops.

8. In a device for cambering a wire shaped into loops obtained with the hand machine as claimed in claim 7, a general frame, two pivoted cambering jaws, springs for restoring said jaws to open position and a movable shaping mandrel, so that the engagement of the wire in flat loops, in said jaws by said mandrel, determines the closing of said jaws and the rolled shaping of said loops by said jaws on said shaping mandrel.

ANDRÉ LUCIEN MARTIN.